(12) United States Patent
Garrity et al.

(10) Patent No.: US 7,633,779 B2
(45) Date of Patent: Dec. 15, 2009

(54) METHOD AND APPARATUS FOR OPERATING A LIGHT EMITTING DIODE WITH A DIMMER

(75) Inventors: Paul J. Garrity, Rockwall, TX (US); Fredric S. Maxik, Weston, FL (US)

(73) Assignee: Lighting Science Group Corporation, Dallas, TX (US)

( * ) Notice: Subject to any disclaimer, the term of this patent is extended or adjusted under 35 U.S.C. 154(b) by 207 days.

(21) Appl. No.: 11/700,409

(22) Filed: Jan. 31, 2007

(65) Prior Publication Data

US 2008/0180036 A1    Jul. 31, 2008

(51) Int. Cl.
*H02M 7/00*    (2006.01)
*H05B 41/16*   (2006.01)

(52) U.S. Cl. .............................. 363/70; 363/37; 363/69; 363/21.02; 363/40; 315/247; 315/209 R; 315/291; 315/DIG. 4

(58) Field of Classification Search .............. 363/21.02, 363/21.1, 21.11, 21.18, 26, 37, 39, 40, 44, 363/45, 46, 48, 60, 61, 67, 69, 70; 315/247, 315/246, 224, 225, 209 R, 291, DIG. 4, 275, 315/272, 307
See application file for complete search history.

(56) References Cited

U.S. PATENT DOCUMENTS

| 6,580,231 | B1 * | 6/2003 | Kramer | ....................... 315/291 |
| 2003/0102824 | A1 * | 6/2003 | Kramer | ....................... 315/307 |

* cited by examiner

*Primary Examiner*—Tuyet Vo
(74) *Attorney, Agent, or Firm*—Cantor Colburn LLP

(57) ABSTRACT

A circuit includes an input and an output, and an electronic light generator drive portion that is coupled to the input and drives the output. In one configuration, the circuit includes a further portion that is coupled to the input and that tunes a resonance at the input to a first frequency, the further portion having an additional portion with a resonance that is tuned to a second frequency different from the first frequency, and that effects damping of the first frequency at the input. In a different configuration, the drive portion includes an electronic switch coupled to the output of the circuit, and a further portion coupled to the input and having a phase tracking portion, the phase tracking portion tracking a phase of a signal at the input and producing a control signal that is used to control the electronic switch.

14 Claims, 3 Drawing Sheets

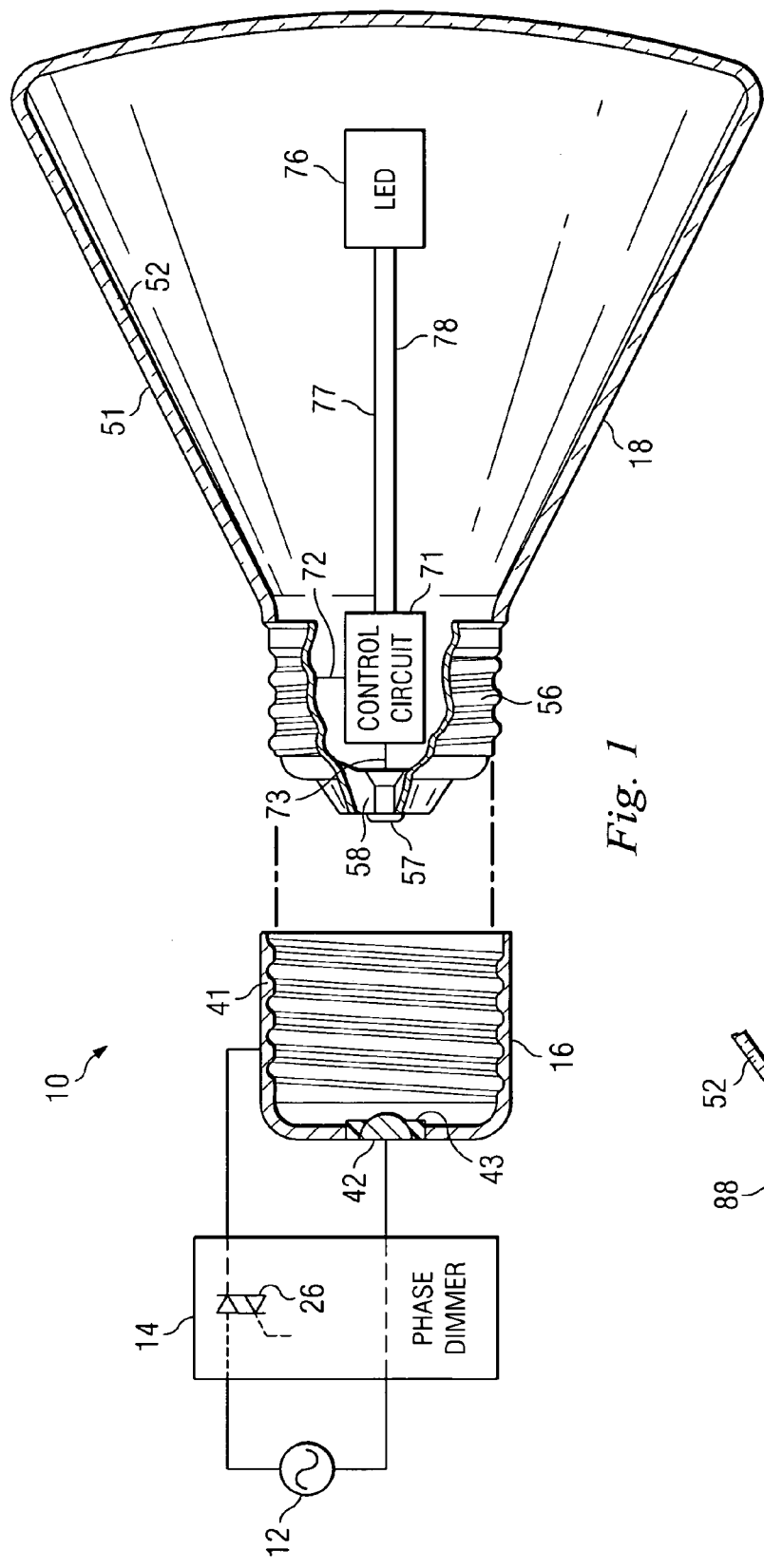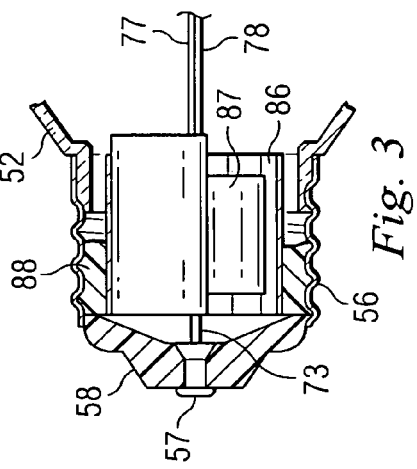
Fig. 1
Fig. 3

METHOD AND APPARATUS FOR OPERATING A LIGHT EMITTING DIODE WITH A DIMMER

FIELD OF THE INVENTION

This invention relates in general to devices that emit electromagnetic radiation and, more particularly, to devices that use light emitting diodes or other semiconductor parts to produce electromagnetic radiation.

BACKGROUND

Over the past century, a variety of different types of lightbulbs have been developed, including incandescent lightbulbs and fluorescent lights. The incandescent bulb is currently the most common type of bulb. In an incandescent bulb, electric current is passed through a metal filament disposed in a vacuum, causing the filament to glow and emit light. The impedance or load characteristic of a standard incandescent bulb is basically resistive in nature.

Recently, bulbs have been developed that produce illumination in a different manner, in particular through the use of light emitting diodes (LEDs). Pre-existing LED lightbulbs have been generally adequate for their intended purposes, but they have not been satisfactory in all respects. As one aspect of this, LED lightbulbs include a driver circuit for the LEDs. These driver circuits are peak charging from the line voltage, and are typically not power factor correcting circuits. LED driver circuits that are not power factor correcting typically have a conduction angle of 30-40 degrees. They exhibit a negative impedance characteristic, rather than a resistive characteristic comparable to that of a standard incandescent bulb.

Dimmers are widely sold today for use with standard incandescent lightbulbs, or in other words bulbs that have a resistive characteristic. Most such dimmers include a triac that produces an output signal, and the output signal is applied to the lightbulb. These dimmers work well with standard incandescent bulbs. However, LED lightbulbs have not worked satisfactorily with these dimmers. More specifically, when used with an LED lightbulb having a negative impedance characteristic (rather than a resistive characteristic), the load applied to the triac is not always sufficient to keep the triac in conduction. Thus, when the triac is supposed to stay on, it will instead tend to oscillate on and off. Further, triacs typically have a resonant frequency, and this resonance can foster the undesired oscillation.

It would be possible to design a dimmer that is not subject to this triac problem. However, for an LED lightbulb to be commercially viable, it is highly desirable that the LED lightbulb be compatible with existing electrical circuits (including those with phase dimmers), so that the LED lightbulb can be readily substituted almost anywhere that a comparable incandescent bulb is used. Electrically, one very simple solution would be to provide a large resistor in the bulb that loads the triac, thereby keeping the triac in conduction, while simultaneously damping its resonance. But as a practical matter, such a resistor would have a physical size that would be too large to be conveniently packaged within the form factor of a typical lightbulb. Further, such a resistor would dissipate a significant amount of power, causing it to be inefficient, and thus relatively expensive to operate. Moreover, the large power dissipation of the resistor would result in the emission of a significant amount of heat. It would be difficult to extract this much heat from the base of a lightbulb. Thus other components (such as integrated circuits) would be heated to temperatures beyond their specifications.

BRIEF DESCRIPTION OF THE DRAWINGS

A better understanding of the present invention will be realized from the detailed description that follows, taken in conjunction with the accompanying drawings, in which:

FIG. 1 is a block diagram of a light generating apparatus that embodies aspects of the invention, and that includes a power source, a phase dimmer, a socket, and a lightbulb, the lightbulb generating light using light emitting diodes.

FIG. 3 is a fragmentary sectional side view showing a base portion of the lightbulb of FIG. 1.

DETAILED DESCRIPTION

Figure 2:
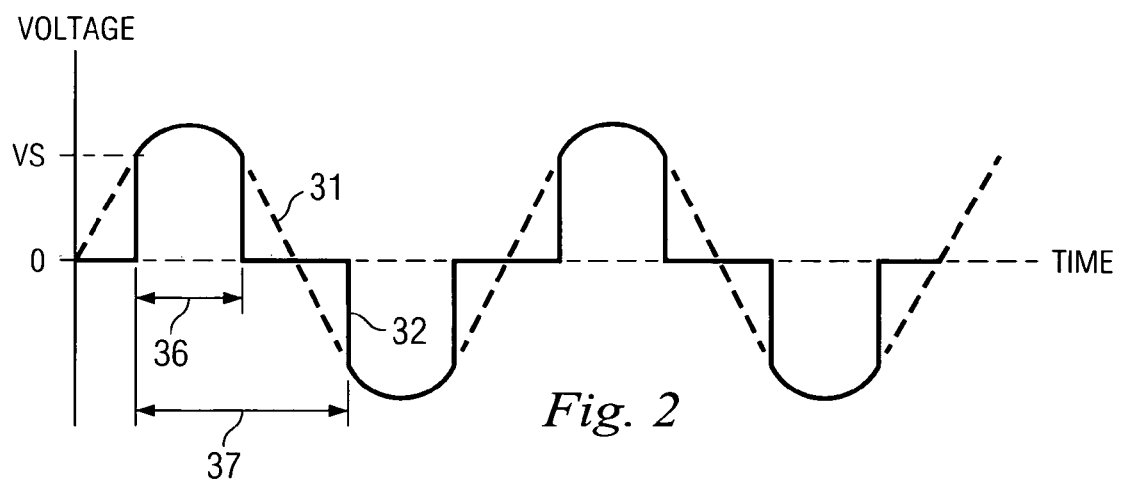
FIG. 2 is a graph showing a typical output signal from the phase dimmer of FIG. 1.

FIG. 1 is a block diagram of a light generating apparatus 10 that includes a power source 12, a phase dimmer 14, a socket 16 and a lightbulb 18. In the illustrated embodiment, the power source 12 generates standard household power of 120V at 60 Hz. However, the power source could alternatively generate power at some other voltage and/or frequency.

The phase dimmer 14 is a commercially-available device, and is configured to replace a standard wall-mounted light switch. The phase dimmer 14 has a not-illustrated control knob that is supported for linear sliding movement or for rotational movement. When the knob is manually moved in one direction, the dimmer 14 causes a progressive increase in the amount of light produced by the lightbulb 18. When the knob is manually moved in the opposite direction, the dimmer 14 causes a progressive decrease in the amount of light produced by the lightbulb 18. Since the circuitry within the dimmer 14 is conventional, it is not shown and described in detail here. For purposes of the present disclosure, it is sufficient to understand that the circuitry in the phase dimmer 14 includes a triac 26, and the triac produces the output signal of the phase dimmer.

FIG. 2 is a graph showing a typical output signal from the triac 26 in the phase dimmer 14. More specifically, the broken line 31 represents the 120V, 60 Hz sine wave input that the dimmer receives from the power source 12. Reference numeral 32 designates the output signal of the phase dimmer 14, as produced by the triac 26. Each pulse of the output signal 32 has a width 36. As the not-illustrated control knob of the phase dimmer 14 is manually moved, the triac 26 varies the width 36 of the pulses in the output signal 32. In particular, when the control knob is manually moved in a direction that calls for more light, the pulse width 36 is increased. Conversely, when the control knob is manually moved in a direction that calls for less light, the pulse width 36 is decreased.

FIG. 2 identifies a switching voltage VS. When the pulse width 36 decreases, the switching voltage VS increases. Conversely, when the pulse width 36 increases, the switching voltage VS decreases. Reference numeral 37 designates one-half of the period of the output signal 32. The ratio of one pulse width 36 to the half-period 37 is the duty cycle of the output signal 32. When the phase dimmer 14 is fully on, the duty cycle is typically about 65%, and the switching voltage VS has its lowest value, which is greater than 65V.

Referring again to FIG. 1, the socket 16 is a commercially-available socket of a type found in most lamps and light fixtures, and is configured to receive the threaded base of a standard lightbulb. More specifically, the socket 16 is configured to receive a lightbulb base that conforms to an industry standard known as an E26 or E27-type base, or more commonly a medium "Edison" base. Alternatively, however, the socket 16 could have any of a variety of other configurations, including but not limited to configurations that are compatible with bulb bases commonly known as a candelabra base, a mogul base, or a bayonet base. The socket 16 includes a cup-shaped metal shell 41 with internal threads. A metal button 42 is centrally supported on an inner end wall of the shell 41 by a part 43 that is made of an insulating material 43. The insulating material 43 electrically isolates the button 42 from the shell 41. The shell 41 and the button 42 serve as respective electrical contacts. The shell 41 and button 42 are each electrically coupled to the output of the phase dimmer 14, and in particular are coupled to respective different terminals of the triac 26.

The lightbulb 18 includes a housing 51, and the housing 51 has a transparent portion 52 and a base 56. The transparent portion 52 is made from a material that is transparent to radiation produced by the lightbulb 18. For example, the transparent portion 52 can be made of glass or plastic. The base 56 is a medium Edison base, but could alternatively have any of a variety of other configurations, including but not limited to those known as a candelabra base, a mogul base, or a bayonet base. The base 56 is made of metal and has exterior threads, and serves as an electrical contact. A metal button 57 is supported on and electrically insulated from the base 56 by an annulus 58 of an electrically insulating material. The button 57 serves as a further electrical contact. The base 56 can be removably screwed into the socket 16, until the buttons 42 and 57 physically engage each other and are thus in electrical contact.

A control circuit 71 is disposed within the base 56, and has two input leads or wires 72 and 73 that respectively electrically couple it to the base 56 and the button 57. A light emitting diode (LED) 76 is supported within the lightbulb 18 by a not-illustrated support structure. The LED 76 is electrically coupled to the output of the control circuit 71 by two leads or wires 77 and 78. The lightbulb 18 actually includes a plurality of the LEDs 76 that are all coupled to the output of the control circuit 71. However, for simplicity and clarity, and since FIG. 1 is a block diagram, FIG. 1 shows only one of the LEDs 76.

FIG. 3 is a fragmentary sectional side view showing the base portion of the lightbulb 18 of FIG. 1. A flexible circuit board 86 is shaped to form an approximately cylindrical sleeve or ring, and is disposed within the base 56. The electrical components of the control circuit 71 of FIG. 1 are mounted on the circuit board 86. Reference numeral 87 designates one of the electrical components of the control circuit 71. The components of the control circuit 71 are electrically coupled by not-illustrated traces or runs within the flexible circuit board 86. The circuit board 86 is held in place within the base 56 by a potting compound or overmolding material 88 of a known type.

As discussed earlier, existing phase dimmers such as that shown at 14 in FIG. 1 are designed to work satisfactorily with standard incandescent bulbs, but have not worked satisfactorily with pre-existing LED lightbulbs. This is because the load that an LED lightbulb applies to the triac 26 (FIG. 1) is not always sufficient to keep the triac in conduction. Thus, when the triac is supposed to stay on, it will instead tend to oscillate on and off. The triac 26 has a resonant frequency, and this resonance can foster the undesired oscillation.

An LED lightbulb is more commercially viable if it can be readily substituted for virtually any comparable incandescent bulb. Therefore, since many incandescent bulbs are installed in circuits that include a phase dimmer of the type show at 14 in FIG. 1, it would be beneficial to have an LED lightbulb that operates satisfactorily and efficiently with a phase dimmer. With reference to the lightbulb 18 in FIG. 1, the control circuit 71 has aspects that permit it to operate satisfactorily with a phase dimmer such as that shown at 14 in FIG. 1.

Figure 4:
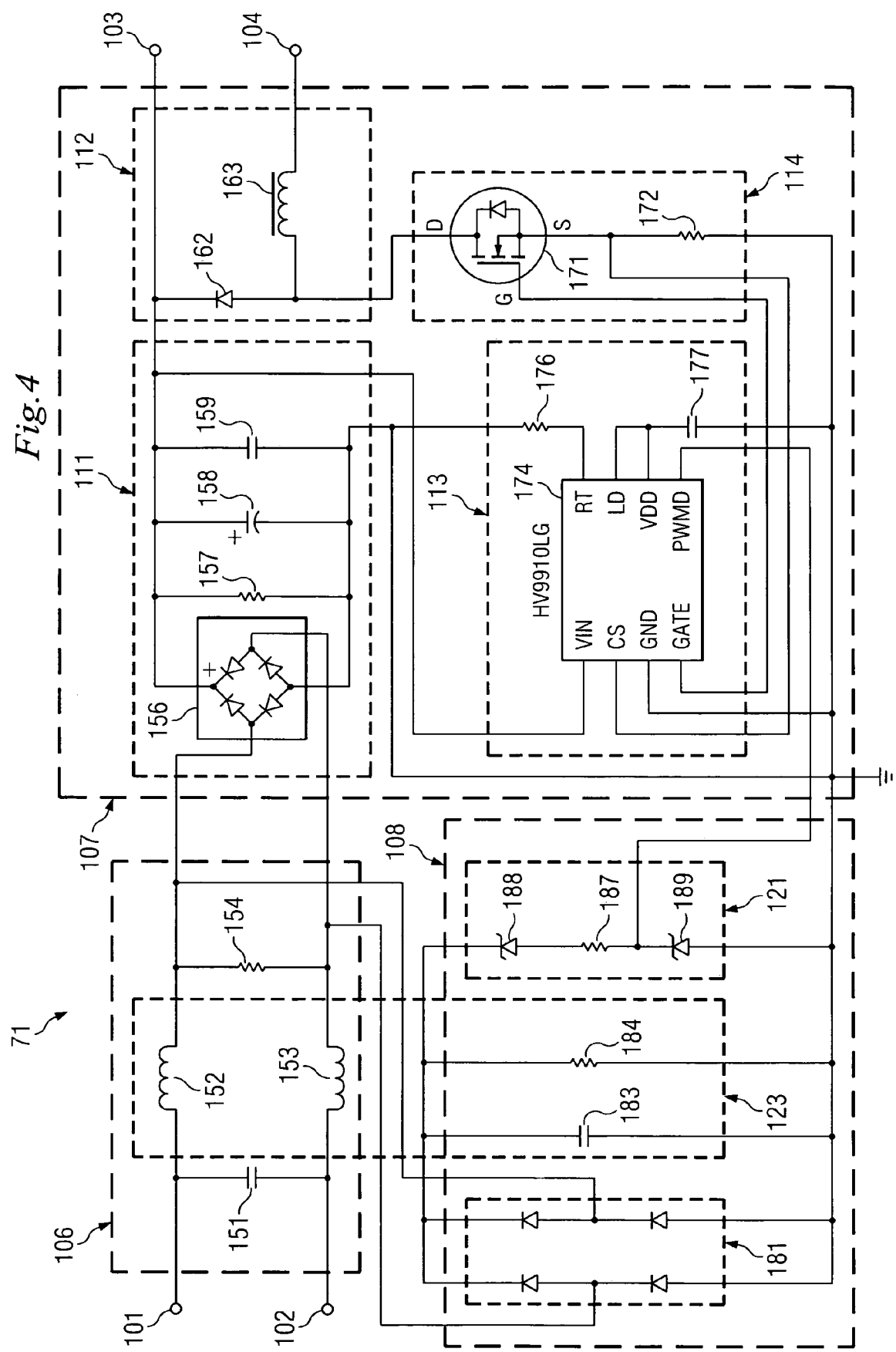
FIG. 4 is a schematic circuit diagram showing the circuitry of a control circuit that is part of the lightbulb of FIG. 1.

In more detail, FIG. 4 is a schematic circuit diagram showing the actual circuitry of the control circuit 71 of FIG. 1. The control circuit 71 has two input terminals 101 and 102, and two output terminals 103 and 104. The control circuit has an input section 106 that is coupled to the input terminals 101 and 102, and has an electronic light generator drive section 107 that is coupled between the input section 106 and the output terminals 103 and 104. An auxiliary section 108 is coupled to the input section 106 and to the drive section 107. The drive section 107 includes a rectifying and filtering section 111, an output section 112, a control section 113, and a switching section 114. The auxiliary section 108 includes a phase tracking section 121. Selected portions of the input section 106 and the auxiliary section 108 together form a preload and damping section 123.

Turning now to specific circuit components, a capacitor 151 has its ends respectively coupled to the input terminals 101 and 102. Two inductors 152 and 153 each have one end coupled to a respective one of the input terminals 101 and 102, and each have a further end that is coupled to a respective end of a resistor 154.

A diode bridge 156 has two input terminals that are coupled to respective ends of the resistor 154. A resistor 157 and two capacitors 158 and 159 are coupled in parallel with each other between two output terminals of the diode bridge 156, and one of the output terminals of the diode bridge 156 is coupled to ground. A diode 162 and a coil 163 are coupled in series with each other between the output terminals 103 and 104, with the cathode of the diode coupled to the output terminal 103 and also to an output terminal of the diode bridge 156. A transistor 171 has its drain coupled to the anode of diode 162, and a resistor 172 is coupled between ground and the source of transistor 171.

An integrated circuit 174 is a commercially available part, and in particular can be obtained from Supertex, Inc. of Sunnyvale, Calif. as part number HV9910LG. Since the integrated circuit 174 is a known component, it is discussed here only briefly, and its internal circuitry is not illustrated and explained in detail. The integrated circuit 174 has an input VIN that is coupled to the cathode of the diode 162. The integrated circuit 174 receives operating power through the input VIN. A current sensing input CS is coupled to the source of transistor 171. A ground pin GND is coupled to ground. A gate control output GATE is coupled to the gate of transistor 171.

The integrated circuit 174 has an oscillator control input RT that is coupled to ground through a resistor 176. The value of the resistor 176 sets the frequency of an internal oscillator within the integrated circuit 174. In the disclosed embodiment, the internal oscillator produces a signal with a frequency of 100 KHz. A pulse width modulation control input (PWMD) is coupled to the phase tracking circuit 121, as discussed in more detail later. Two pins LD and VDD are each coupled to one end of a capacitor 177, and the other end of capacitor 177 is coupled to ground.

The auxiliary circuit 108 includes a diode bridge 181 with two input terminals that are each coupled to a respective end of the resistor 154. The diode bridge 181 also has two output terminals, one of which is coupled to ground. A resistor 183 and a capacitor 184 are each coupled between the output terminals of the diode bridge 181, in parallel with each other. The phase tracking section 121 includes a resistor 187 and two Zener diodes 188 and 189 that are all coupled in series with each other between the outputs of the diode bridge 181. The resistor 187 is disposed between the two Zener diodes, the anode of diode 189 is coupled to ground, and the anode of diode 188 is coupled to the resistor 187. The cathode of diode 189 is coupled to the control input PWMD of the integrated circuit 174.

The following is a brief synopsis of the operation of the circuit 71 of FIG. 4. The signal 32 (FIG. 2) from the phase dimmer 14 (FIG. 1) is applied to the input terminals 101 and 102 of the control circuit 71. The input section 106 of the control circuit 71 carries out some filtering and protection, and then the signal 32 is rectified and filtered by the rectifying and filtering section 111. The output of the section 111 provides operating power to the integrated circuit 174, and to the output circuit 112. As noted earlier, the resistor 176 has a value that causes an internal oscillator in the integrated circuit 174 to oscillate at a frequency of approximately 100 KHz. Depending on the state of the control input PWMD, the integrated circuit 174 either applies the 100 KHz signal to the gate of transistor 171, or else disables the gate of transistor 171.

Figure 5:
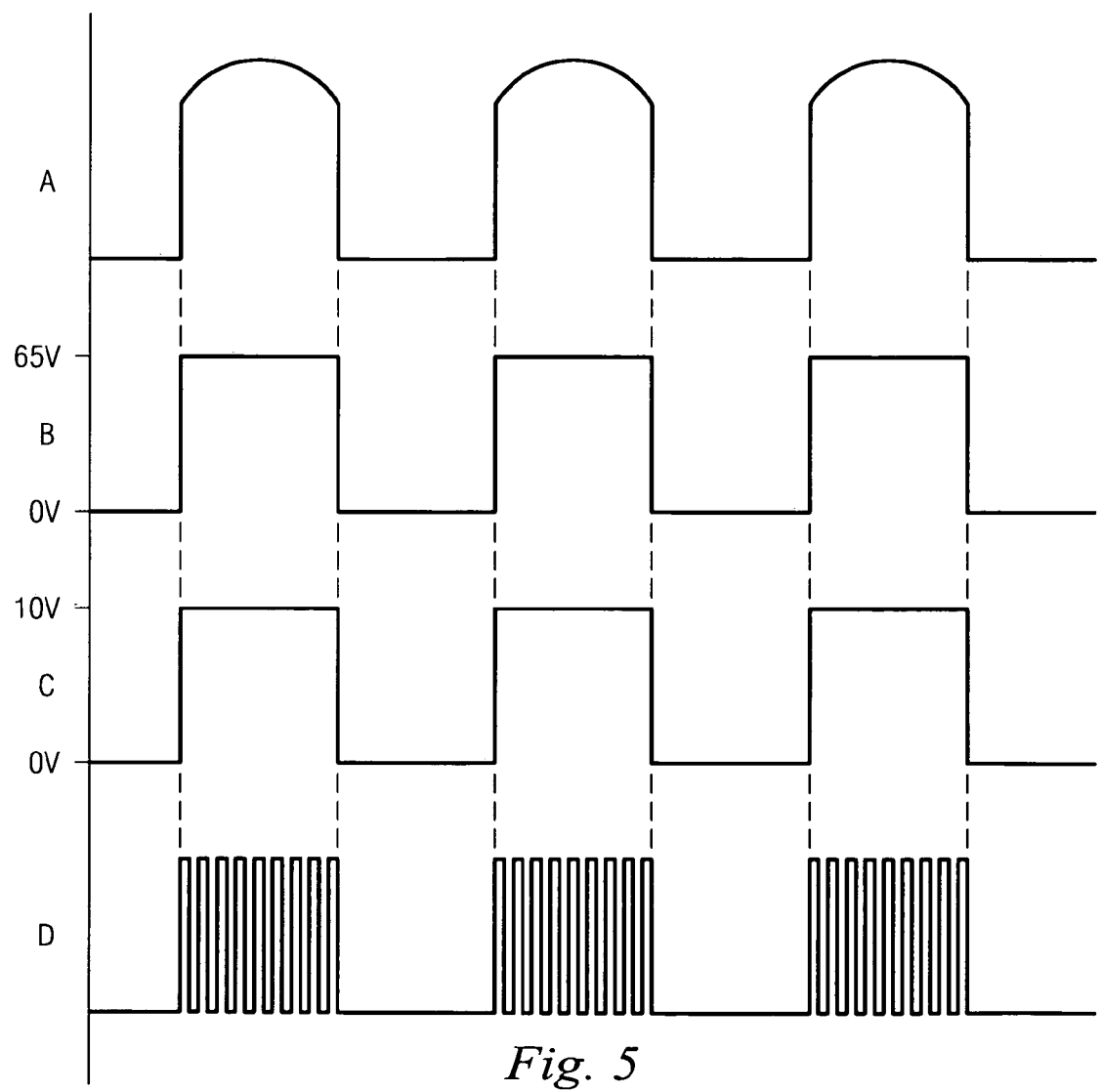
FIG. 5 is a timing diagram that shows several different waveforms relating to the control circuit of FIG. 4.

The diode bridge 181 takes the filtered signal from the input circuit 106, and rectifies it. FIG. 5 is a timing diagram that shows several different waveforms relating to the control circuit 71. The diode bridge 181 attempts to output a rectified signal that looks like waveform A in FIG. 5. However, the Zener diodes 188 and 189 in the phase tracking section 121 clamp the magnitude of this output signal at 65V, as discussed later. Consequently, the peaks of the pulses are clipped, and the signal at the output of the diode bridge 181 actually is the square wave signal shown at B in FIG. 5, which has a peak magnitude of 65 volts.

As discussed earlier, it has been problematic to use preexisting LED lightbulbs with a phase dimmer such as that shown at 14 in FIG. 1. In particular, the load applied to the triac 26 is not always sufficient to keep the triac in conduction, and the triac therefore oscillates on and off when it is supposed to stay on. This oscillation is compounded by the fact that triacs have a resonant frequency. This resonance can tend to encourage the triac to engage in the undesired oscillation at the resonant frequency. The particular resonant frequency will, of course, vary somewhat from part to part and from manufacturer to manufacturer.

In FIG. 4, the capacitor 151 tunes the resonant frequency of the triac to a selected frequency, in order to make it easier to damp the resonance of the triac. The preload and damping section 123 is designed to resonate at a resonant frequency different from and significantly lower than the tuned resonant frequency of the triac, for example a resonant frequency that is at least a decade lower. This frequency differential ensures that the preload and damping section 123 will damp the resonance of the triac, rather than resonating with it. The resistor 184 also serves to keep the triac under a preload that is sufficient to keep the triac from going out of conduction. Consequently, the triac stays on when it is supposed to be on, rather than oscillating on and off.

Turning now to the phase tracking circuit 189, and as mentioned above, the diode bridge 181 attempts to output a signal that would theoretically have the waveform shown at A in FIG. 5. When the magnitude of this signal is less than 65V, or in other words at any time between pulses, the Zener diodes 188 and 189 are nonconducting, and thus the cathode of the diode 189 is at 0V. Accordingly, the potential of 0V at the cathode of diode 189 is applied to the control input PWMD of the integrated circuit 174. Conversely, when a pulse occurs, the magnitude of the signal A (FIG. 5) would theoretically exceed 65V. But as soon as it reaches 65V, the Zener diodes 188 and 189 reach their breakdown voltages and begin conducting, thereby clamping the output of the diode bridge 181 at a potential of 65V, so as to yield the waveform B of FIG. 5.

As mentioned earlier, the switching voltage VS (FIG. 2) for the triac 26 is always greater than 65V, regardless of the current duty cycle of the triac 26. Consequently, by configuring the phase tracking section 121 so that a voltage of 65V causes the Zener diodes to experience breakdown, the phase tracking section 121 will always track the full width of each of the pulses from the triac. Stated differently, when the triac is operating at its maximum duty cycle of about 65%, where the pulse width 36 is at its maximum, the switching voltage VS of the triac will be greater than 65V, and thus the phase tracking section will accurately detect both the rising and falling edges of each pulse from the triac.

The value of the resistor 187 is selected so that, when the cathode of diode 188 is at 65V, the cathode of diode 189 will be at 10V. Thus, a potential of 10V is applied to the control input PWMD of the integrated circuit 174. The waveform C in FIG. 5 is the control signal that is produced at the cathode of diode 189, and that is applied to the control input PWMD of the integrated circuit 174.

When the signal at control input PWMD is 0V, the integrated circuit 174 disables its output GATE, so that the potential there is 0V. On the other hand, when the signal at control input PWMD is 10 volts, the integrated circuit 174 supplies a 100 KHz signal to its GATE output. The waveform D in FIG. 5 is a diagrammatic representation of the signal that is produced by the integrated circuit 174 at its output GATE. Although the high frequency pulses at the GATE output occur at a frequency of 100 KHz, for clarity they are diagrammatically shown in waveform D of FIG. 5 with a pulse width and period that correspond to a lower frequency. The signal from the GATE output of the integrated circuit 174 is applied to the gate of the transistor 171. In response to a 100 KHz pulse burst at its gate, the transistor 171 causes the output circuit 112 to apply a 100 KHz pulse burst to the LED 76 (FIG. 1).

The preload and damping section 123, in addition to providing preload and damping functions, also provides some high frequency filtering that keeps the 100 KHz switching frequency used for the transistor 171 and the LED 76 from leaking back through the input terminals 101 and 102 to the phase dimmer 14 and power source 12. The cutoff frequency for this high frequency filter is the resonant frequency of the preload and damping section 123.

The control circuit 71 in the lightbulb 18 permits the LED lightbulb 18 to be substituted for an equivalent incandescent bulb and to operate properly, regardless of whether or not a phase dimmer is present. If there is a phase dimmer, its triac 26 will operate properly without resonant oscillation, and the LED 76 will dim properly through a wide range of brightness as the control knob of the dimmer is manually adjusted. On the other hand, if there is no dimmer, the lightbulb 18 will still operate entirely properly.

The preload and damping section 123 is efficient, in that it uses a nominal amount of electricity, and thus operates at a low cost. Also, since the preload and damping section is efficient, it does not emit large amounts of heat that would be difficult to dissipate from within a lightbulb, and that could thus overheat electrical components within the lightbulb. Moreover, the components in the preload and damping section 123 are relatively small in physical size, thereby permitting the entire control circuit 71 to be implemented in a sufficiently small and compact space so that it can be disposed substantially entirely within a medium Edison base, for example in the manner discussed above in association with FIG. 3.

In a variation of the circuit shown in FIG. 4, it would be possible to modify the phase tracking section 121 to add a not-illustrated sensor that influences the voltage potential between resistor 187 and diode 189, as a function of a selected condition. The sensor could be any of a wide variety of sensors that monitor various different conditions. For example, the sensor could be a photocell that monitors the amount of ambient light, or a temperature sensor that monitors the ambient temperature.

Although a selected embodiment has been illustrated and described in detail, it should be understood that a variety of substitutions and alterations are possible without departing from the spirit and scope of the present invention, as defined by the claims that follow.

What is claimed is:

1. An apparatus comprising a circuit that includes:
an input;
an output;
an electronic light generator drive portion that is coupled to said input and that drives said output; and
a further portion that is coupled to said input and that tunes a resonance at said input to a first frequency, said further portion having an additional portion with a resonance that is tuned to a second frequency different from said first frequency, and that effects damping of said first frequency at said input.

2. An apparatus according to claim 1, wherein said second frequency is more than a decade lower than said first frequency.

3. An apparatus according to claim 2, wherein said first frequency corresponds to a resonant frequency of a triac.

4. An apparatus according to claim 2,
wherein said electronic light generator drive portion can selectively supply a high frequency signal to said output of said circuit; and
wherein said further portion effects high frequency filtering to isolate said high frequency signal from said input of said circuit.

5. An apparatus according to claim 1, including:
a light bulb housing having a transparent portion and an electrical connector portion; and
an electronic light generator disposed within said housing, said circuit being disposed within said housing with said input thereof coupled to said connector portion and said output thereof coupled to said electronic light generator, light from said electronic light generator passing through said transparent portion of said housing.

6. An apparatus according to claim 5,
wherein said electrical connector portion is an Edison base; and
wherein said circuit is disposed substantially within said Edison base.

7. An apparatus according to claim 1,
wherein said input includes first and second terminals;
wherein said further portion includes a diode bridge having two input terminals and two output terminals;
wherein said additional portion includes first and second inductors each having a first end coupled to a respective one of said first and second terminals and having a second end coupled to a respective one of said input terminals of said diode bridge; and
wherein said additional portion includes a capacitor having first and second ends that are each coupled to a respective one of said output terminals of said diode bridge, and a resistor having first and second ends that are each coupled to a respective one of said output terminals of said diode bridge.

8. An apparatus according to claim 7,
wherein said electronic light generator drive portion includes an electronic switch that is coupled to said output of said circuit, and includes a control portion that has a control input and that controls said electronic switch as a function of said control input; and
wherein said further portion includes two Zener diodes coupled in series with each other between said output terminals of said diode bridge, said control input of said control portion being coupled to a circuit node between said diodes.

9. An apparatus according to claim 8, wherein said further portion includes a resistor disposed between and coupled in series with said diodes, said circuit node being located between said resistor and one of said diodes.

10. An apparatus according to claim 7,
wherein said further portion includes a capacitor with each of its ends coupled to a respective one of said first and second terminals of said input;
wherein said further portion includes a resistor with each of its ends coupled to said second end of a respective one of said inductors; and
wherein said electronic light generator drive portion includes a further diode bridge having two input terminals that are each coupled to said second end of a respective one of said inductors.

11. A method of operating a circuit having an input and an output, comprising:
tuning a resonance at said input to a first frequency;
damping said first frequency at said input with circuitry having a resonance tuned to a second frequency different from said first frequency; and
supplying to said output an electronic light generator drive signal.

12. A method according to claim 11, including selecting said second frequency to be more than a decade lower than said first frequency.

13. A method according to claim 11, including:
carrying out said supplying in a manner that causes said drive signal to include a high frequency component; and
effecting high frequency filtering to isolate said input from said drive signal.

14. A method according to claim 11,
including tracking a phase of a signal at said input to produce a control signal; and
wherein said supplying includes selectively supplying a high frequency signal to said output as a function of said control signal.

* * * * *